(12) United States Patent
Lou et al.

(10) Patent No.: US 8,102,370 B2
(45) Date of Patent: Jan. 24, 2012

(54) MODE-CHANGEABLE SLIM MOUSE

(75) Inventors: Chin-Kuan Lou, Taipei (TW); Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 494 days.

(21) Appl. No.: 12/349,759

(22) Filed: Jan. 7, 2009

(65) Prior Publication Data

US 2010/0127980 A1  May 27, 2010

(30) Foreign Application Priority Data

Nov. 26, 2008 (TW) ................................ 97145621 A (51) Int. Cl.
*G09G 5/08* (2006.01)
(52) U.S. Cl. ......... 345/163; 345/164; 345/168; 345/169
(58) Field of Classification Search ........................ None
See application file for complete search history.

(56) References Cited

U.S. PATENT DOCUMENTS

| 5,943,625 | A * | 8/1999 | Yeom et al. | 455/557 |
|---|---|---|---|---|
| 7,532,199 | B2 * | 5/2009 | Kubo et al. | 345/161 |
| 7,808,482 | B2 * | 10/2010 | Lin et al. | 345/163 |
| 7,817,138 | B2 * | 10/2010 | Chiang | 345/163 |
| 7,830,363 | B2 * | 11/2010 | Chiang | 345/163 |
| 2004/0179330 | A1 * | 9/2004 | Lee et al. | 361/679 |
| 2006/0088310 | A1 * | 4/2006 | Jung | 396/429 |
| 2007/0132733 | A1 * | 6/2007 | Ram | 345/163 |
| 2007/0200824 | A1 * | 8/2007 | Choo | 345/163 |
| 2007/0211028 | A1 * | 9/2007 | Lin et al. | 345/163 |
| 2007/0252816 | A1 * | 11/2007 | Yen | 345/163 |
| 2007/0268252 | A1 * | 11/2007 | Chiang et al. | 345/163 |
| 2009/0027340 | A1 * | 1/2009 | Huang et al. | 345/163 |
| 2010/0265179 | A1 * | 10/2010 | Ram | 345/163 |

* cited by examiner

*Primary Examiner* — Dismery Mercedes
(74) *Attorney, Agent, or Firm* — Kirton & McConkie; Evan R. Witt (57) ABSTRACT

A mode-changeable slim mouse includes a mouse body, a battery box casing and a connecting mechanism. Via the connecting mechanism, the battery box casing is connected to the mouse body and rotatable with respect to the mouse body. By rotating the battery box casing to different positions with respect to the mouse body, the mode-changeable slim mouse is operated in various operating modes.

21 Claims, 6 Drawing Sheets

MODE-CHANGEABLE SLIM MOUSE

FIELD OF THE INVENTION

The present invention relates to a slim mouse, and more particularly to a mode-changeable slim mouse operated in a cursor controller mode or a remote controller mode.

BACKGROUND OF THE INVENTION

With rapid development of electronic and information industries, computers and the peripheral device thereof become essential parts in our daily lives. For example, mice are important peripheral devices of computers for establishing contact between the personal computers and the users. For helping the user well operate the computer, many novel mice with expanded functions are developed in views of humanization and user-friendliness.

For complying with these various functions of the personal computer, in addition to the conventional cursor control function, the mouse usually has additional function keys used as the controller for presentation control and/or video control.

In a case that the mouse is used as a cursor controller, by moving the mouse on a desk plane, the cursor shown on the display screen of the personal computer is moved in the corresponding movement direction of the mouse. In another case that the mouse is used as a remote controller for presentation control and/or video control, the mouse is held on the palm of the user's hand and the function keys are pressed down to input the operating instructions.

Generally, the shape of the mouse used as the cursor controller and the shape of the mouse used as the remote controller are different. In a case that the mouse is used as a cursor controller to be moved on the desk plane, the surface of the mouse contacting with the palm of the user's hand should be cambered rather than flat because the cambered surface of the mouse may facilitate supporting the palm of the user's hand. Whereas, in another case that the mouse is used as the remote controller, the user favors the mouse having a flat shape as the conventional remote controller. In other words, it is difficult to design a slim mouse having both functions of using as the cursor controller and the remote controller. If the housing of the mouse is too thin, the mouse fails to meet the ergonomic demand. If the height and thickness of the mouse is increased, the touch feel of the mouse is impaired when the mouse is used as the remote controller.

Therefore, there is a need of providing a mode-changeable slim mouse meeting the ergonomic demand when acted as a cursor controller and having a flat shape when acted as a remote controller.

SUMMARY OF THE INVENTION

It is an object of the present invention to provide a slim mouse with multiple operating modes, in which the operating modes are easily switched as required.

In accordance with an aspect of the present invention, there is provided a mode-changeable slim mouse operable in a cursor controller mode or a remote controller mode. The mode-changeable slim mouse includes a mouse body, a battery box casing and a connecting mechanism. The mouse body has a plurality of click buttons. The battery box casing has a first connecting post, which is accommodated within the mouse body for connecting the battery box casing and the mouse body. The battery box casing is rotatable with respect to the mouse body with the first connecting post serving as a rotating shaft, thereby switching an operating mode of the mode-changeable slim mouse to the cursor controller mode or the remote controller mode. The connecting mechanism is arranged between the mouse body and the battery box casing for connecting the mouse body with the battery box casing, and includes a first connecting part and a second connecting part. The first connecting part is fixed on the battery box casing and includes a first concave structure and a second concave structure. The second connecting part is fixed on the mouse body and includes a convex structure. When the battery box casing is rotated to a first position with respect to the mouse body, the convex structure is engaged with the first concave structure such that the mode-changeable slim mouse is operated in the cursor controller mode. When the battery box casing is rotated to a second position with respect to the mouse body, the convex structure is engaged with the second concave structure such that the mode-changeable slim mouse is operated in the remote controller mode.

In an embodiment, the mode-changeable slim mouse further includes a battery box, which is accommodated within the battery box casing for containing a battery and comprises a first positive electrode piece at a first end thereof and a first negative electrode spring at a second end thereof. The first positive electrode piece and the first negative electrode spring are respectively contacted with a positive electrode and a negative electrode of the battery for transmitting electricity of the battery.

In an embodiment, the battery box further includes a second positive electrode piece. The second positive electrode piece is embedded in a sidewall of the battery box such that a first surface of the second positive electrode piece is exposed outside the battery box and a second surface of the second positive electrode piece is contacted with the first positive electrode piece.

In an embodiment, the battery box further includes a battery box hole at the second end of the battery box such that the first negative electrode spring is exposed outside the battery box through the battery box hole.

In an embodiment, the battery box casing further includes a third positive electrode piece and a second negative electrode spring. The third positive electrode piece is contacted with the second positive electrode piece. The second negative electrode spring is partially received in the battery box hole and contacted with the first negative electrode spring.

In an embodiment, the battery box casing further includes a negative electrode piece and a power control board. The negative electrode piece is contacted with the second negative electrode spring. The power control board is electrically connected to the third positive electrode piece and the negative electrode piece for transmitting the electricity of the battery to the mouse body.

In an embodiment, the first connecting post has a perforation and the mode-changeable slim mouse further includes a conductive wire penetrated through the perforation. The conductive wire has a first terminal connected to the power control board and a second terminal connected to the mouse body.

In an embodiment, the mode-changeable slim mouse further includes a battery lid for sheltering the battery box after the battery box is accommodated in the battery box casing.

In an embodiment, the mode-changeable slim mouse further includes a circuit board disposed within the mouse body. In addition, multiple switch elements are mounted on the circuit board corresponding to respective click buttons. The switch elements are triggered to issue corresponding control commands to the circuit boards when respective click buttons are pressed down.

In an embodiment, the mode-changeable slim mouse further includes a cursor controller mode switch element and a remote controller mode switch element. When the controller mode switch element is triggered, the mode-changeable slim mouse is operated in the cursor controller mode. When the remote controller mode switch element is triggered, the mode-changeable slim mouse is operated in the remote controller mode.

In an embodiment, the mode-changeable slim mouse further includes a first triggering part and a second triggering part. The first triggering part and the second triggering part are disposed on the first connecting post and moved with the first connecting post upon rotation of the battery box casing, so that the cursor controller mode switch element is triggered by the first triggering part or the emote controller mode switch element is triggered by the second triggering part.

In an embodiment, the battery box casing further includes a second connecting post accommodated within the mouse body. The first connecting part is a fixing ring sheathed around the second connecting post. The convex structure is a steel ball. The second connecting part is a damper including a damper spring, a damper seat and a damper casing. The steel ball and the damper spring are accommodated within the damper seat. The damper seat is accommodated within the damper casing. The damper casing has a through-hole. The steel ball is partially protruded out of the through-hole to be contacted with the fixing ring via the through-hole. The damper spring is compressed to offer an elastic force on the steel ball.

In an embodiment, the fixing ring is fixed onto the second connecting post by a screw.

In an embodiment, the fixing ring is made of metallic material.

In an embodiment, the first connecting part further includes a connecting shaft. The second connecting part further includes a coupling ring. The convex structure is formed on the coupling ring. The coupling ring is sheathed around the connecting shaft such that the convex structure is contacted with the first connecting part.

In an embodiment, the connecting mechanism further includes a spring and a nut. The spring is sheathed around the connecting shaft for offering an elastic force on the coupling ring. The nut is fastened onto the connecting shaft to fix the coupling ring and the spring on the connecting shaft.

In an embodiment, the mode-changeable slim mouse is in a power off mode when the battery box casing is in a horizontal position to be substantially parallel with the mouse body.

In an embodiment, the mode-changeable slim mouse is operated in the cursor controller mode when the battery box casing is rotated downwardly from the horizontal position to the first position.

In an embodiment, the mode-changeable slim mouse is operated in the remote controller mode when the battery box casing is rotated upwardly from the horizontal position to the second position.

In an embodiment, the mode-changeable slim mouse further includes an optical finger navigation module for scrolling a frame shown on a screen.

In an embodiment, the mode-changeable slim mouse further includes a scroll wheel for scrolling a frame shown on a screen.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a mode-changeable slim mouse operated in a cursor controller mode or a remote controller mode.

Figure 1:
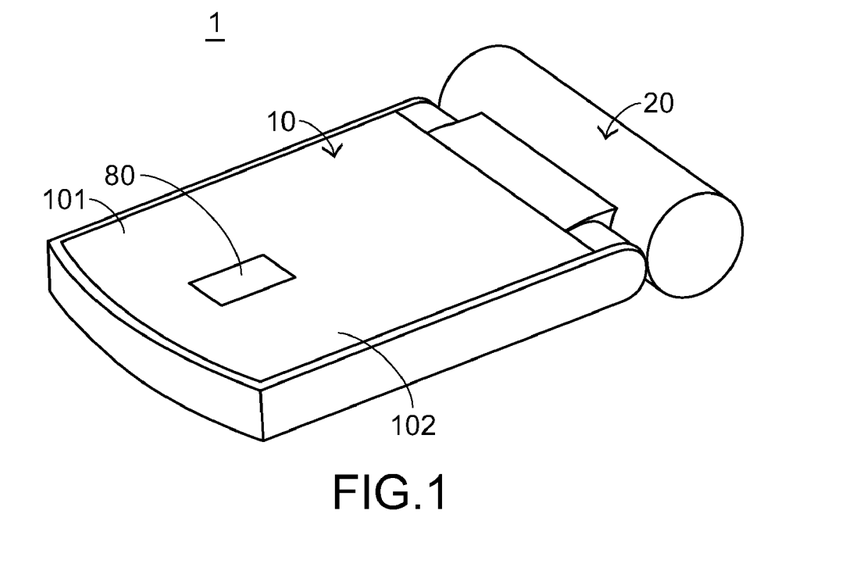
FIG. 1 is a schematic perspective view illustrating the supporting mechanism of a scanning apparatus according to the prior art.
Figure 2:
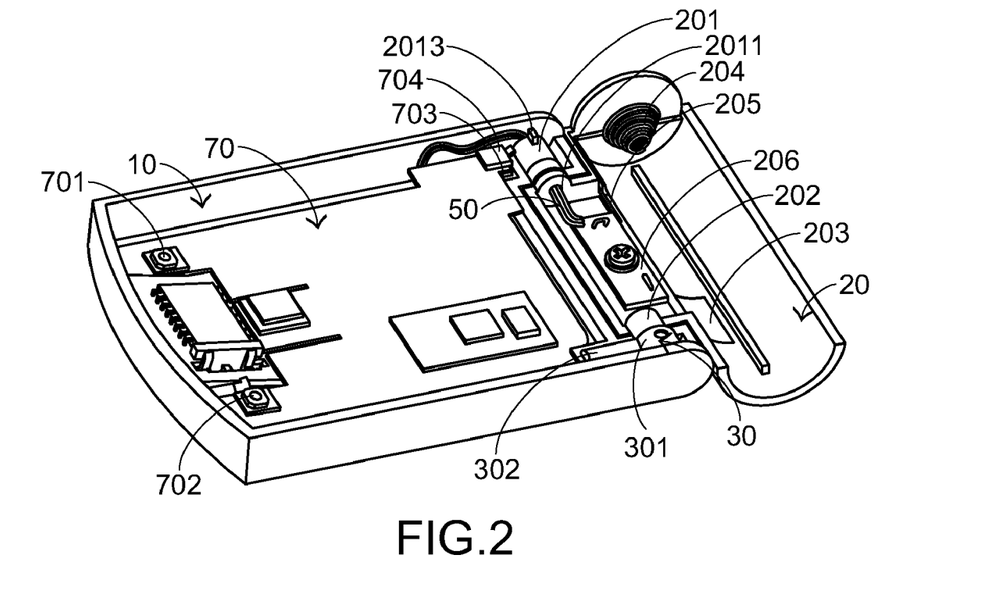
FIG. 2 is a schematic perspective view illustrating the internal components of the mode-changeable slim mouse as shown in FIG. 1.

FIG. 1 is a schematic perspective view illustrating a mode-changeable slim mouse according to a first preferred embodiment of the present invention. As shown in FIG. 1, the slim mouse 1 principally comprises a mouse body 10, a battery box casing 20 and a connecting mechanism 30 (as shown in FIG. 2). The mouse body 10 comprises a plurality of click buttons and an optical finger navigation (OFN) module 80. The click buttons includes for example a first click button 101 and a second click button 102. When the first click button 101 and the second click button 102 are pressed down, corresponding switch elements 701 and 702 (as shown in FIG. 2) under these click buttons 101 and 102 are triggered to issue corresponding control commands. The use of the optical finger navigation module 80 can replace the scroll wheel of a conventional wheel mouse so as to scroll a frame shown on a screen.

FIG. 2 is a schematic perspective view illustrating the internal components of the mode-changeable slim mouse as shown in FIG. 1. As shown in FIG. 2, a circuit board 70 is disposed within the mouse body 10. Corresponding to the first click button 101 and the second click button 102, a first switch element 701 and a second switch element 702 are respectively mounted on the circuit board 70. When the click button 101 or 102 is pressed down, the switch element 701 or 702 (as shown in FIG. 2) is triggered to issue a corresponding control command to the circuit board 70. In addition, a cursor controller mode switch element 703 and a remote controller mode switch element 704 are disposed on two opposite surfaces of the circuit board 70. In a case that the cursor controller mode switch element 703 is triggered, the slim mouse 1 is operated in the cursor controller mode. Whereas, in another case that the remote controller mode switch element 704 is triggered, the slim mouse 1 is operated in the remote controller mode.

Figure 3:
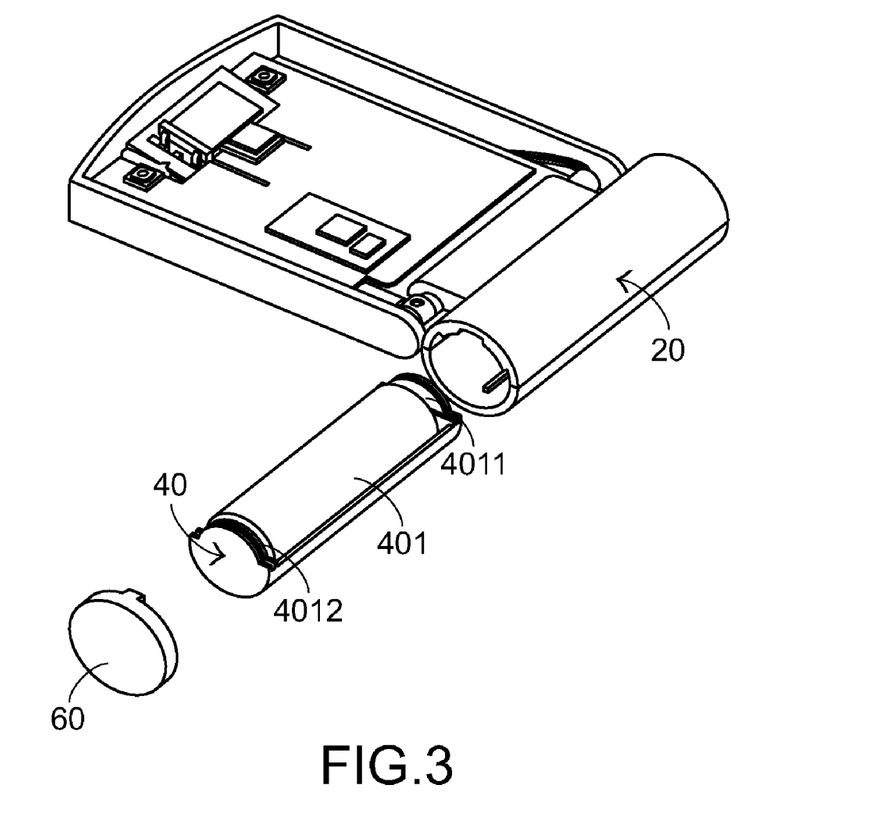
FIG. 3 is a schematic exploded view illustrating the battery box casing, the battery box and the battery lid of the mode-changeable slim mouse according to the first preferred embodiment of the present invention.

Please refer to FIG. 2 again. A receptacle is formed within the battery box casing 20 for accommodating a battery box 40 (as shown in FIG. 3). The battery box casing 20 has a first connecting post 201 and a second connecting post 202. The first connecting post 201 and the second connecting post 202 are fixed to corresponding fixing structures within the mouse body 10, so that the battery box casing 20 is pivotally coupled to the mouse body 10. That is, the battery box casing 20 is rotatable with respect to the mouse body 10 by using the connecting posts 201 and 202 as the rotating shaft. By rotating the battery box casing 20 to different positions, the slim mouse 1 may be operated in the cursor controller mode or the remote controller mode. The first connecting post 201 has a perforation 2011. A conducting wire 50 may be penetrated through the perforation 2011 so as to electrically connect corresponding electronic components of the battery box casing 20 and the mouse body 10. Moreover, a first triggering part 2012 (not shown) and a second triggering part 2013 are disposed on the first connecting post 201. The first triggering part 2012 and the second triggering part 2013 are rotated with the battery box casing 20. In a case that the first triggering part 2012 is contacted with the cursor controller mode switch element 703 upon rotation of the battery box casing 20 in a first direction, the slim mouse 1 is operated in the cursor controller mode. Whereas, in another case that the second triggering part 2013 is contacted with the remote controller mode switch element 704 upon rotation of the battery box casing 20 in a second direction, the slim mouse 1 is operated in the remote controller mode. The connecting mechanism 30 is arranged between the mouse body 10 and the battery box casing 20 for connecting the mouse body 10 with the battery box casing 20. The connecting mechanism 30 comprises a first connecting part 301 and a second connecting part 302. The first connecting part 301 is disposed on the battery box casing 20. The second connecting part 302 is disposed on the mouse body 10. The first connecting part 301 and the second connecting part 302 are contacted with each other. In the embodiment of FIG. 2, the first connecting part 301 is a fixing ring and the second connecting part 302 is a damper.

FIG. 3 is a schematic exploded view illustrating the battery box casing, the battery box and the battery lid of the mode-changeable slim mouse according to the first preferred embodiment of the present invention. As shown in FIG. 3, after a battery 401 is contained in the battery box 40 and the battery box 40 is accommodated in the receptacle of the battery box casing 20, the entrance of the battery box casing 20 is sheltered by the battery lid 60.

Figure 4:
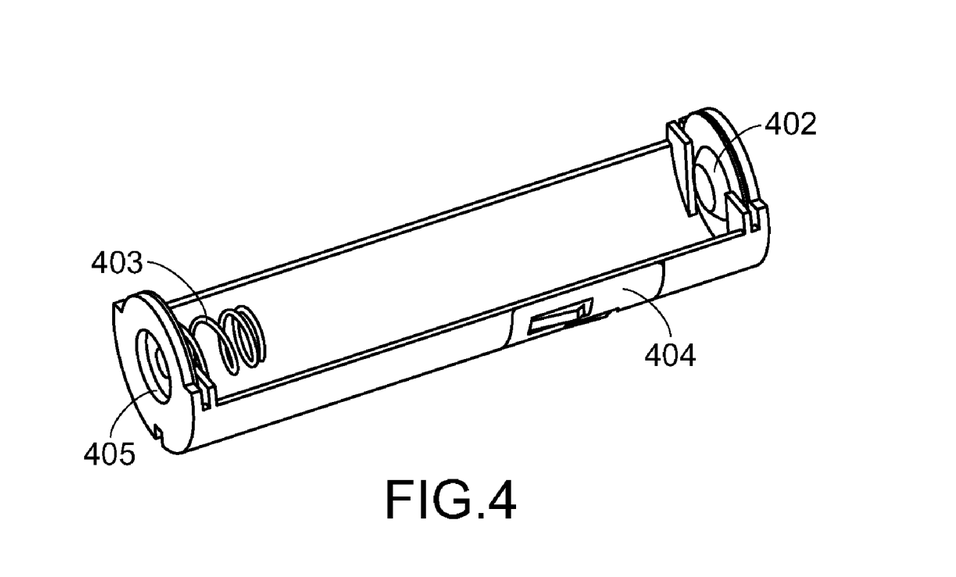
FIG. 4 is a schematic perspective view illustrating the battery box of the mode-changeable slim mouse according to the first preferred embodiment of the present invention.

FIG. 4 is a schematic perspective view illustrating the battery box of the mode-changeable slim mouse according to the first preferred embodiment of the present invention. As shown in FIG. 4, the battery box 40 comprises a first positive electrode piece 402, a second positive electrode piece 404, a first negative electrode spring 403 and a battery box hole 405. The first positive electrode piece 402 is disposed at a first end of the battery box 40. The first negative electrode spring 403 is disposed at a second end of the battery box 40. When the battery 401 is accommodated in the battery box 40, the positive electrode 4011 and the negative electrode 4012 of the battery 401 are respectively contacted with the first positive electrode piece 402 and the first negative electrode spring 403 so as to deliver electricity of the battery 401. The second positive electrode piece 404 is embedded in a sidewall of the battery box 40 such that a first surface of the second positive electrode piece 404 is exposed outside the battery box 40 and a second surface of the second positive electrode piece 404 is contacted with the first positive electrode piece 402. The battery box hole 405 is disposed at a second end of the battery box 40 such that the first negative electrode spring 403 is exposed outside the battery box 40 through the battery box hole 405.

Please refer to FIG. 2 and FIG. 4. The battery box casing 20 further comprises a third positive electrode piece 203, a second negative electrode spring 204, a negative electrode piece 205 and a power control board 206. The second negative electrode spring 204 is connected to the negative electrode piece 205. The third positive electrode piece 203 and the negative electrode piece 205 are both electrically connected to the power control board 206. When the battery box 40 is accommodated within the receptacle of the battery box casing 20, the third positive electrode piece 203 is contacted with the second positive electrode piece 404, and the second negative electrode spring 204 is partially received in the battery box hole 405 and contacted with the first negative electrode spring 403. As such, a electric loop is created from the positive electrode 4011 to the negative electrode 4012 of the battery 401 through the first positive electrode piece 402, the second positive electrode piece 404, the third positive electrode piece 203, the power control board 206, the negative electrode piece 205, the second negative electrode spring 204 and the first negative electrode spring 403. In addition, a conducting wire 50 has a first terminal connected to the power control board 206 and a second terminal connected to the circuit board 70, wherein the conducting wire 50 is penetrated through the perforation 2011 of the first connecting post 201 such that the conducting wire 50 is confined in position. Via the conducting wire 50, the electricity of the battery 401 can be transmitted from the power control board 206 to the circuit board 70.

Hereinafter, the configurations of the connecting mechanism 30 will be illustrated in more details with reference to FIG. 5 and FIGS. 6A and 6B.

Figure 5:
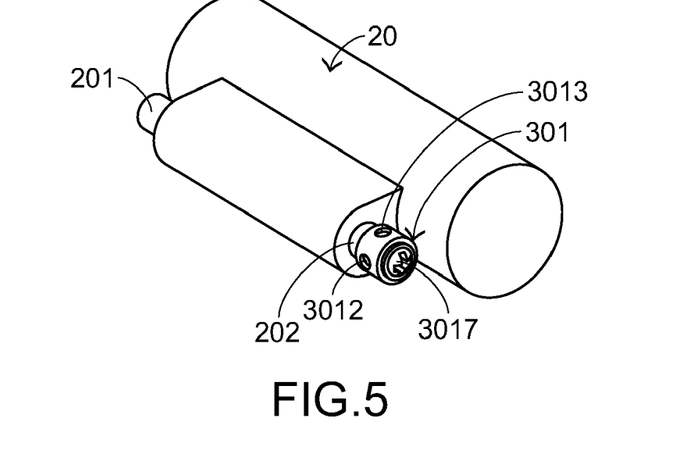
FIG. 5 is a schematic perspective view illustrating the first connecting part of the connecting mechanism of the mode-changeable slim mouse according to the first preferred embodiment of the present invention.

FIG. 5 is a schematic perspective view illustrating the first connecting part of the connecting mechanism of the mode-changeable slim mouse according to the first preferred embodiment of the present invention. In this embodiment, the first connecting part 301 is a fixing ring. A first concave structure (not shown), a second concave structure 3012 and a third concave structure are formed in the periphery of the fixing ring 301. The fixing ring 301 is made of metallic material and sheathed around the second connecting rod 202 of the battery box casing 20. A screw 3017 is screwed in a tail surface of the second connecting rod 202 to facilitate attaching the fixing ring 301 on the second connecting rod 202.

Figure 6A:
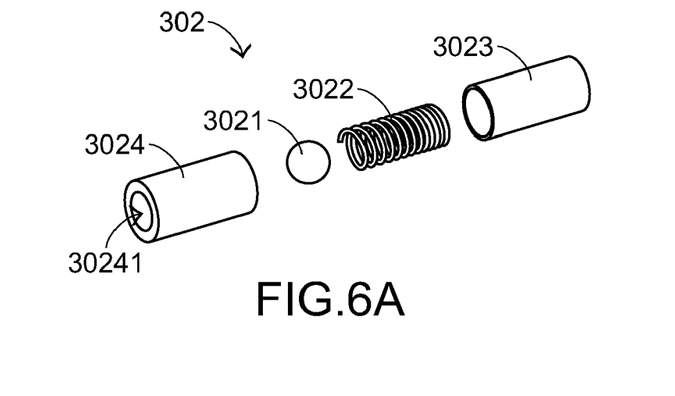
FIG. 6A is a schematic exploded view illustrating the second connecting part of the connecting mechanism of the mode-changeable slim mouse according to the first preferred embodiment of the present invention.
Figure 6B:
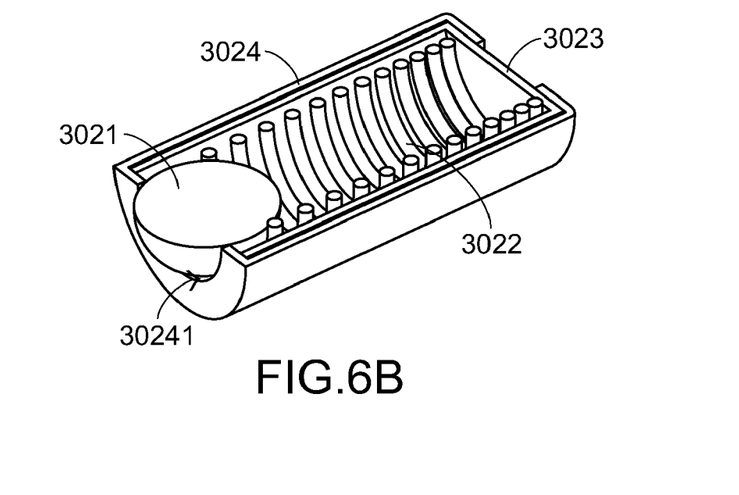
FIG. 6B is a schematic cutaway view illustrating the second connecting part of the connecting mechanism of the mode-changeable slim mouse according to the first preferred embodiment of the present invention.

FIG. 6A is a schematic exploded view illustrating the second connecting part of the connecting mechanism of the mode-changeable slim mouse according to the first preferred embodiment of the present invention. FIG. 6B is a schematic cutaway view illustrating the second connecting part of the connecting mechanism of the mode-changeable slim mouse according to the first preferred embodiment of the present invention. In this embodiment, the second connecting part 302 is a damper. The second connecting part 302 comprises a convex structure 3021, a damper spring 3022, a damper seat 3023 and a damper casing 3024. An example of the convex structure 3021 is a steel ball. The steel ball 3021 and the damper spring 3022 are accommodated within the damper seat 3023. The damper casing 3024 has a through-hole 30241. After the damper seat 3023 is accommodated within a cylindrical chamber of the damper casing 3024, the steel ball 3021 is partially protruded out of the through-hole 30241 of the damper casing 3024. When the damper spring 3022 is compressed, the compressed damper spring 3022 can offer an elastic force on the steel ball 3021 (as shown in FIG. 6B).

Figure 7:
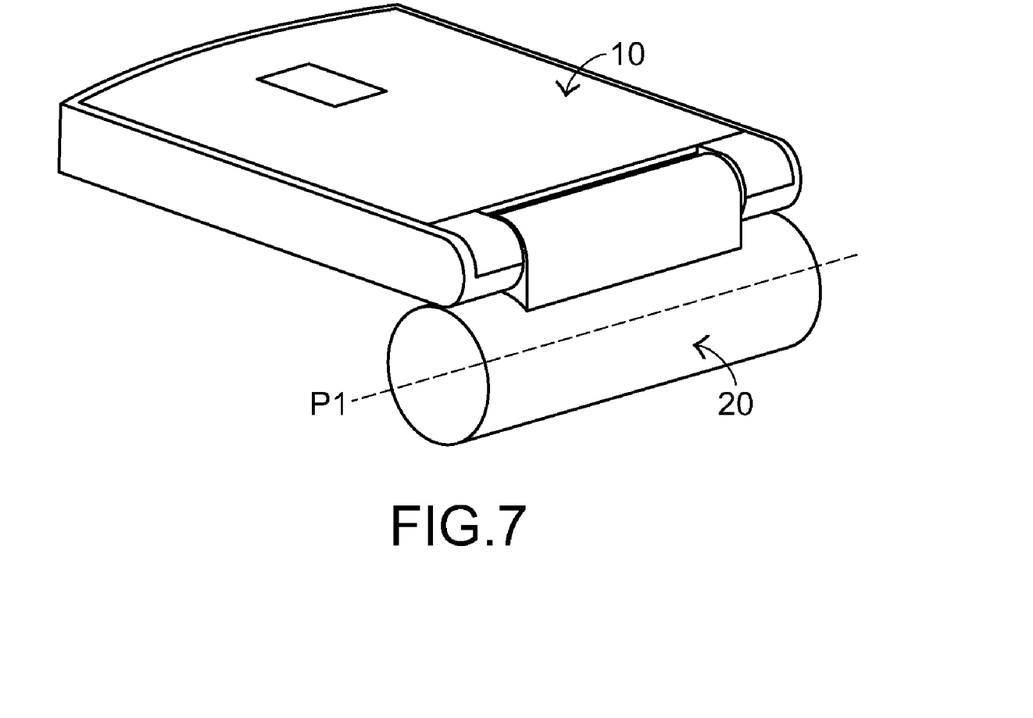
FIG. 7 is a schematic perspective view illustrating the mode-changeable slim mouse in a cursor controller mode according to the first preferred embodiment of the present invention.

Hereinafter, the operations of the connecting mechanism 30 will be illustrated in more details with reference to FIGS. 2, 5 and 6B. In a case that the slim mouse 1 is in a power off mode and the battery box casing 20 is located in a horizontal position to be substantially parallel with the mouse body 10, the steel ball 3021 of the damper 302 is engaged with the second concave structure 3012 of the fixing ring 301. For switching the operating mode of the slim mouse 1 from the power off mode to the cursor controller mode, the battery box casing 20 is rotatable with respect to the mouse body 10 in the downward direction by using the connecting posts 201 and 202 as the rotating shaft. During rotation of the battery box casing 20, the steel ball 3021 is disengaged from the second concave structure 3012 and then sustained against the non-concave structure of the fixing ring 301, and sunken into the interior of the damper 302. At this moment, the steel ball 3021 is sustained against the damper spring 3022 such that the damper spring 3022 is compressed. As the battery box casing 20 is continuously rotated, the fixing ring 301 is also rotated and the steel ball 3021 is continuously sustained against the non-concave structure of the fixing ring 301. Until the battery box casing 20 is rotated to a first position P1 (as shown in FIG. 7), the steel ball 3021 is engaged with the first concave structure (not shown) of the fixing ring 301. Since the first triggering part 2012 on the first connecting post 201 is rotated with the battery box casing 20, the cursor controller mode switch element 703 is pressed down by the first triggering part 2012 at the moment when the battery box casing 20 is located in the first position P1. Meanwhile, the slim mouse 1 can be operated in the cursor controller mode.

Figure 8:
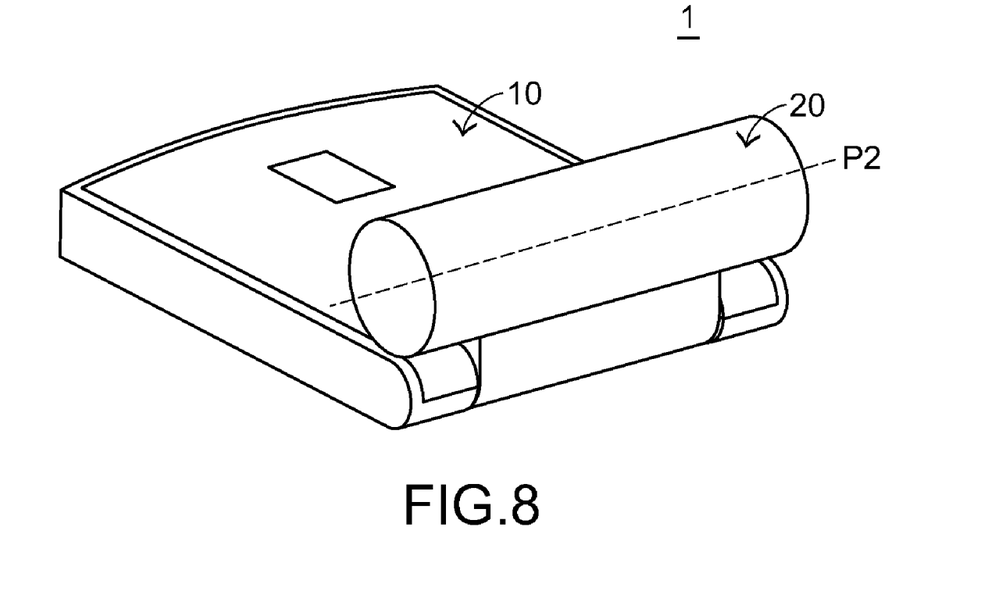
FIG. 8 is a schematic perspective view illustrating the mode-changeable slim mouse in a remote controller mode according to the first preferred embodiment of the present invention.

For switching the operating mode of the slim mouse 1 to the remote controller mode, the battery box casing 20 should be firstly rotated to the horizontal position. Next, the battery box casing 20 is rotatable with respect to the mouse body 10 in the upward direction. Until the battery box casing 20 is rotated to a second position P2 (as shown in FIG. 8), the steel ball 3021 of the damper 302 is engaged with the third concave structure 3013 of the fixing ring 301. Since the second triggering part 2013 on the first connecting post 201 is rotated with the battery box casing 20, the remote controller mode switch element 704 is pressed down by the second triggering part 2013 at the moment when the battery box casing 20 is located in the second position P2. Meanwhile, the slim mouse 1 can be operated in the remote controller mode.

Figure 9:
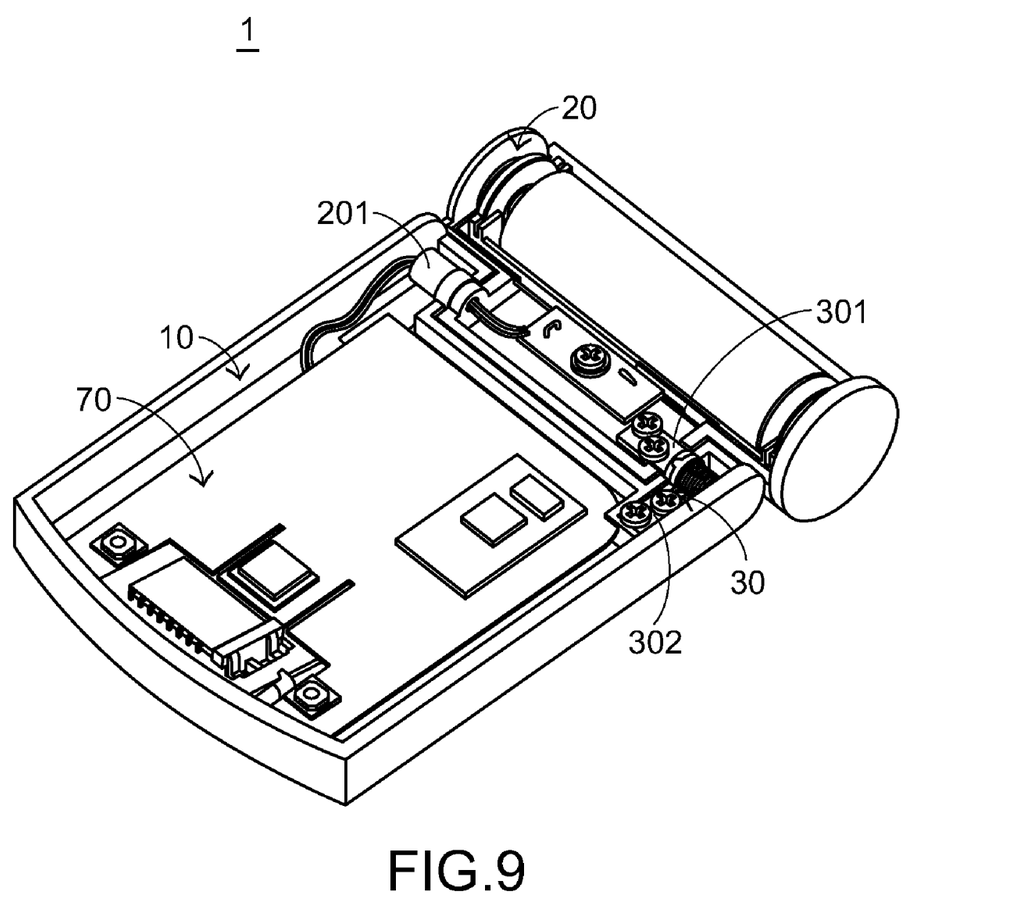
FIG. 9 is a schematic perspective view illustrating the internal components of a mode-changeable slim mouse according to a second preferred embodiment of the present invention.

FIG. 9 is a schematic perspective view illustrating the internal components of a mode-changeable slim mouse according to a second preferred embodiment of the present invention. As shown in FIG. 9, the slim mouse 1 principally comprises a mouse body 10, a battery box casing 20 and a connecting mechanism 30. Except that the battery box casing 20 has a single connecting post 201 and the connecting mechanism 30 is distinguished, the mode-changeable slim mouse of this embodiment is substantially identical to that of the first preferred embodiment. The connecting mechanism 30 comprises a first connecting part 301 and a second connecting part 302. The first connecting part 301 is disposed on the battery box casing 20. The second connecting part 302 is disposed on the mouse body 10.

Figure 10:
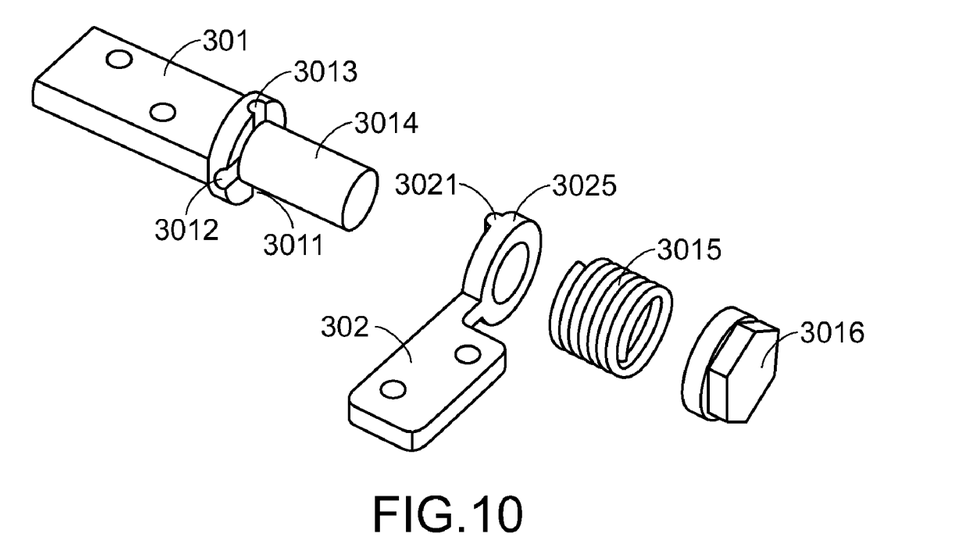
FIG. 10 is a schematic exploded view illustrating the connecting mechanism of the mode-changeable slim mouse according to the second preferred embodiment of the present invention.
Figure 11:
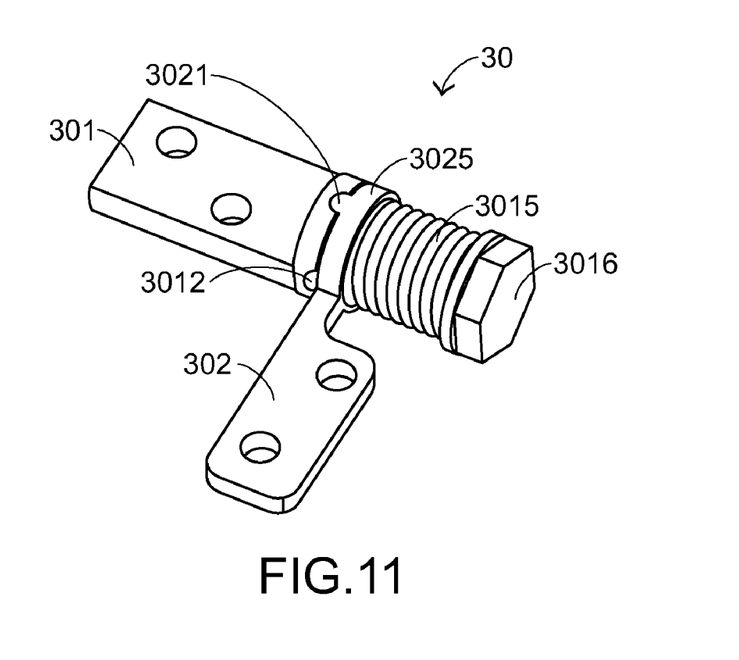
FIG. 11 is a schematic assembled view of the connecting mechanism shown in FIG. 10.

FIG. 10 is a schematic exploded view illustrating the connecting mechanism of the mode-changeable slim mouse according to the second preferred embodiment of the present invention. The first connecting part 301 comprises a first concave structure 3011, a second concave structure 3012, a third concave structure 3013 and a connecting shaft 3014. The second connecting part 302 comprises a convex structure 3021 and a coupling ring 3025. The convex structure 3021 is connected to the coupling ring 3025. In addition to the first connecting part 301 and the second connecting part 302, the connecting mechanism 30 further comprises a spring 3015 and a nut 3016. For assembling the connecting mechanism 30, the coupling ring 3025 and the spring 3015 are sequentially sheathed around the connecting shaft 3014, and then the nut 3016 is fastened onto the tail surface of the connecting shaft 3014 to fix the coupling ring 3025 and the spring 3015 on the connecting shaft 3014. The compressed spring 3015 can offer an elastic force. The resulting structure of the assembled connecting mechanism 30 is shown in FIG. 11.

Please refer to FIG. 9. The first connecting part 301 of the connecting mechanism 30 is fastened onto the battery box casing 20 by screwing means. The second connecting part 302 of the connecting mechanism 30 is fastened onto the mouse body by screwing means. In a case that the slim mouse 1 is in a power off mode and the battery box casing 20 is located in a horizontal position to be substantially parallel with the mouse body 10 (as shown in FIG. 1), the concave structure 3021 of the second connecting part 302 is engaged with the second concave structure 3012 of the first connecting part 301. For switching the operating mode of the slim mouse 1 from the power off mode to the cursor controller mode, the battery box casing 20 is rotatable with respect to the mouse body 10 in the downward direction. During rotation of the battery box casing 20, the concave structure 3021 of the second connecting part 302 is disengaged from the second concave structure 3012 and then sustained against the non-concave structure of the first connecting part 301. At this moment, the coupling ring 3025 is sustained against the spring 3015 such that the spring 3015 is compressed. As the battery box casing 20 is continuously rotated, the first connecting part 301 is also rotated and the concave structure 3021 is continuously sustained against the non-concave structure of the first connecting part 301. Until the battery box casing 20 is rotated to a first position P1 (as shown in FIG. 7), the concave structure 3021 is engaged with the first concave structure 3011. Meanwhile, the cursor controller mode switch element 703 is pressed down by the first triggering part 2012, and thus the slim mouse 1 can be operated in the cursor controller mode.

For switching the operating mode of the slim mouse 1 to the remote controller mode, the battery box casing 20 should be firstly rotated to the horizontal position. Next, the battery box casing 20 is rotatable with respect to the mouse body 10 in the upward direction. Until the battery box casing 20 is rotated to a second position P2 (as shown in FIG. 8), the concave structure 3021 of the second connecting part 302 is engaged with the third concave structure 3013. Meanwhile, the remote controller mode switch element 704 is pressed down by the second triggering part 2013, and thus the slim mouse 1 can be operated in the remote controller mode.

In the above embodiments, the mode-changeable slim mouse of the present invention uses the optical finger navigation module to replace the scroll wheel of a conventional wheel mouse because the optical finger navigation module is very thin. Alternatively, a scroll wheel or any other similar component may be used to implement the function of scrolling a frame shown on a screen.

From the above description, the mode-changeable slim mouse is capable of operating in various operating modes by rotating the battery box casing to different positions with respect to the mouse body through the connecting mechanism. In other words, the mode-changeable slim mouse of the present invention can be adjusted to have a slim shape when acted as a remote controller or meet the ergonomic demand when acted as a cursor controller. Therefore, the mode-changeable slim mouse of the present invention is very user friendly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mode-changeable slim mouse operable in a cursor controller mode or a remote controller mode, said mode-changeable slim mouse comprising:
    a mouse body having a plurality of click buttons;
    a battery box casing having a first connecting post, which is accommodated within the mouse body for connecting said battery box casing with said mouse body, wherein said battery box casing is rotatable with respect to said mouse body with said first connecting post serving as a rotating shaft, thereby switching an operating mode of said mode-changeable slim mouse to said cursor controller mode or said remote controller mode; and
    a connecting mechanism arranged between said mouse body and said battery box casing for connecting said mouse body and said battery box casing, and comprising a first connecting part and a second connecting part, wherein said first connecting part is fixed on said battery box casing and comprises a first concave structure and a second concave structure, and said second connecting part is fixed on said mouse body and comprises a convex structure,
    wherein when said battery box casing is rotated to a first position with respect to said mouse body, said convex structure is engaged with said first concave structure such that said mode-changeable slim mouse is operated in said cursor controller mode, and when said battery box casing is rotated to a second position with respect to said mouse body, said convex structure is engaged with said second concave structure such that said mode-changeable slim mouse is operated in said remote controller mode.

2. The mode-changeable slim mouse according to claim 1 further comprising a battery box, which is accommodated within said battery box casing for containing a battery and comprises a first positive electrode piece at a first end thereof and a first negative electrode spring at a second end thereof, wherein said first positive electrode piece and said first negative electrode spring are respectively contacted with a positive electrode and a negative electrode of said battery for transmitting electricity of said battery.

3. The mode-changeable slim mouse according to claim 2 wherein said battery box further comprises a second positive electrode piece, which is embedded in a sidewall of said battery box such that a first surface of said second positive electrode piece is exposed outside said battery box and a second surface of said second positive electrode piece is contacted with said first positive electrode piece.

4. The mode-changeable slim mouse according to claim 3 wherein said battery box further comprises a battery box hole at said second end of said battery box such that said first negative electrode spring is exposed outside said battery box through said battery box hole.

5. The mode-changeable slim mouse according to claim 4 wherein said battery box casing further comprises:
    a third positive electrode piece contacted with said second positive electrode piece; and
    a second negative electrode spring partially received in said battery box hole and contacted with said first negative electrode spring.

6. The mode-changeable slim mouse according to claim 5 wherein said battery box casing further comprises:
    a negative electrode piece contacted with said second negative electrode spring; and
    a power control board electrically connected to said third positive electrode piece and said negative electrode piece for transmitting said electricity of said battery to said mouse body.

7. The mode-changeable slim mouse according to claim 6 wherein said first connecting post has a perforation and said mode-changeable slim mouse further includes a conductive wire penetrated through said perforation, wherein said conductive wire has a first terminal connected to said power control board and a second terminal connected to said mouse body.

8. The mode-changeable slim mouse according to claim 2 further comprising a battery lid for sheltering said battery box after said battery box is accommodated in said battery box casing.

9. The mode-changeable slim mouse according to claim 1 further comprising a circuit board disposed within said mouse body, wherein multiple switch elements are mounted on said circuit board corresponding to respective click buttons, and said switch elements are triggered to issue corresponding control commands to the circuit boards when respective click buttons are pressed down.

10. The mode-changeable slim mouse according to claim 9 further comprising a cursor controller mode switch element and a remote controller mode switch element, wherein said mode-changeable slim mouse is operated in said cursor controller mode when said controller mode switch element is triggered, and said mode-changeable slim mouse is operated in said remote controller mode when said remote controller mode switch element is triggered.

11. The mode-changeable slim mouse according to claim 10 further comprising a first triggering part and a second triggering part, which are disposed on said first connecting post and moved with said first connecting post upon rotation of said battery box casing, so that said cursor controller mode switch element is triggered by said first triggering part or said remote controller mode switch element is triggered by said second triggering part.

12. The mode-changeable slim mouse according to claim 1 wherein said battery box casing further comprises a second connecting post accommodated within the mouse body, said first connecting part is a fixing ring sheathed around said second connecting post, said convex structure is a steel ball, and second connecting part is a damper comprising a damper spring, a damper seat and a damper casing, wherein said steel ball and said damper spring are accommodated within said damper seat, said damper seat is accommodated within said damper casing, said damper casing has a through-hole, said steel ball is partially protruded out of said through-hole to be contacted with said fixing ring via said through-hole, and said damper spring is compressed to offer an elastic force on the steel ball.

13. The mode-changeable slim mouse according to claim 12 wherein said fixing ring is fixed onto said second connecting post by a screw.

14. The mode-changeable slim mouse according to claim 12 wherein said fixing ring is made of metallic material.

15. The mode-changeable slim mouse according to claim 1 wherein said first connecting part further comprises a connecting shaft, said second connecting part further comprises a coupling ring, said convex structure is formed on said coupling ring, and said coupling ring is sheathed around said connecting shaft such that said convex structure is contacted with said first connecting part.

16. The mode-changeable slim mouse according to claim 15 wherein said connecting mechanism further comprises a spring and a nut, said spring is sheathed around said connecting shaft for offering an elastic force on said coupling ring, and said nut is fastened onto said connecting shaft to fix said coupling ring and said spring on said connecting shaft.

17. The mode-changeable slim mouse according to claim 1 wherein said mode-changeable slim mouse is in a power off mode when said battery box casing is in a horizontal position to be substantially parallel with said mouse body.

18. The mode-changeable slim mouse according to claim 17 wherein said mode-changeable slim mouse is operated in said cursor controller mode when said battery box casing is rotated downwardly from said horizontal position to said first position.

19. The mode-changeable slim mouse according to claim 17 wherein said mode-changeable slim mouse is operated in said remote controller mode when said battery box casing is rotated upwardly from said horizontal position to said second position.

20. The mode-changeable slim mouse according to claim 1 further comprising an optical finger navigation module for scrolling a frame shown on a screen.

21. The mode-changeable slim mouse according to claim 1 further comprising a scroll wheel for scrolling a frame shown on a screen.

* * * * *